United States Patent [19]
Jones et al.

[11] 3,884,903
[45] May 20, 1975

[54] 4''-DEOXY-4''-OXOERYTHROMYCIN B DERIVATIVES

[75] Inventors: Peter Hadley Jones, Lake Forest;
Jerry Roy Martin, Waukegan;
James Bruce McAlpine, Libertyville;
Jeanne Marie Pauvlik, Chicago;
John Soloman Tadanier, Waukegan, all of Ill.

[73] Assignee: Abbott Laboratories, North Chicago, Ill.

[22] Filed: Sept. 9, 1974

[21] Appl. No.: 504,417

Related U.S. Application Data

[63] Continuation-in-part of Ser. No. 372,387, June 21, 1973, Pat. No. 3,842,069.

[52] U.S. Cl.............................. 260/210 E; 424/180
[51] Int. Cl........................................... C07c 129/18
[58] Field of Search ................................ 260/210 E

[56] References Cited
UNITED STATES PATENTS 3,417,077  12/1968  Murphy et al.................... 260/210 E
3,842,069  10/1974  Jones et al. ..................... 260/210 E Primary Examiner—Johnnie R. Brown
Assistant Examiner—Cary B. Owens
Attorney, Agent, or Firm—Robert L. Niblack; Vincent A. Mallare

[57] ABSTRACT

Covers a 4''-deoxy-4''-oxoerythromycin compounds and derivatives thereof which are useful as antibiotics having a formula selected from the group consisting of:

Formula I

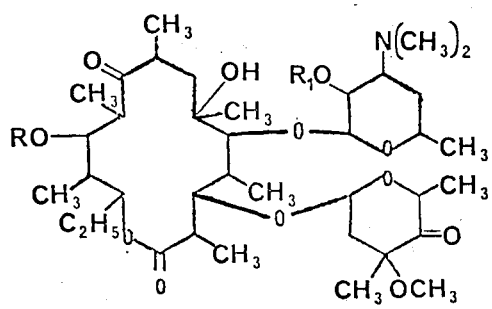

where R is —$CH_2SR_3$, $R_2$ is hydrogen or loweralkyl, $R_3$ is loweralkyl, and $R_1$ is hydrogen or loweralkanoyl;

Formula II

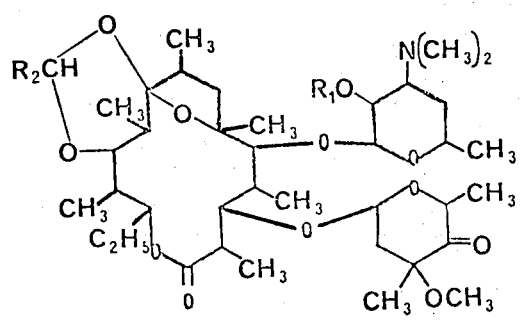

where $R_1$ and $R_2$ are as before defined;

Formula III

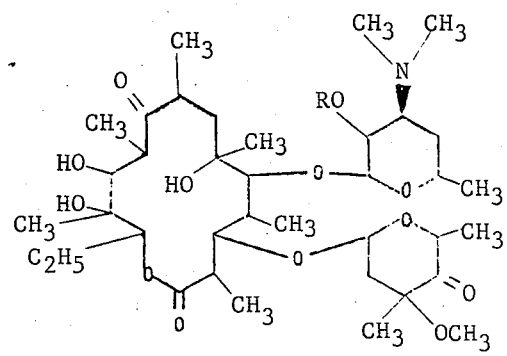

where R is hydrogen or $CH_3CO$;

Formula IV

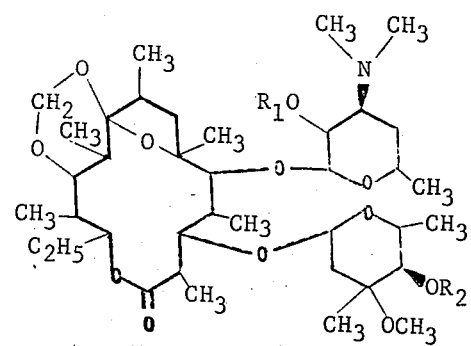

where $R_1$ is hydrogen or RCO, R is loweralkyl, $R_2$ is hydrogen, $CH_3CO$ or RCO where R is loweralkyl; and Formula V

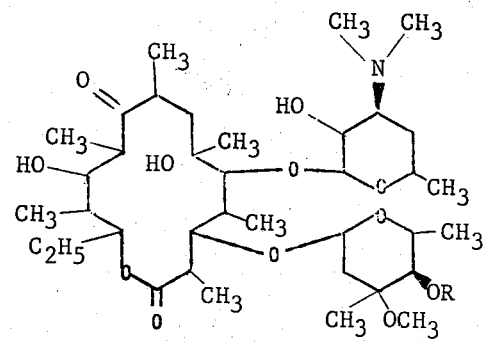

where $R_3$ is hydrogen or RCO where R is loweralkyl.

8 Claims, No Drawings

4''-DEOXY-4''-OXOERYTHROMYCIN B DERIVATIVES

CROSS-REFERENCE TO RELATED APPLICATIONS

This is a continuation-in-part of U.S. application, Ser. No. 372,387 filed June 21, 1973 now U.S. Pat. No. 3,842,069.

DESCRIPTION OF THE INVENTION

This invention relates to 4''-deoxy-4''-oxoerythromycin B derivatives which are useful as antibiotics or as intermediates in preparing other useful antibiotic compounds.

Erythromycin is produced in two forms denoted A and B by cultivating a strain of *Streptomyces erythreus* in a suitable nutrient medium as is taught in U.S. Pat. No. 2,653,899, Bunch, et al. The structure of erythromycin is represented by the following formula:

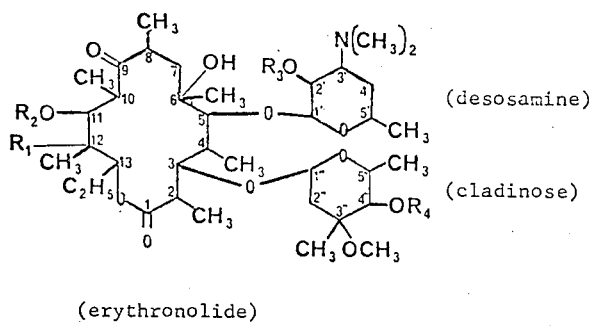

(erythronolide)

In this formula, when $R_2$, $R_3$ and $R_4$ represent hydrogen and $R_1$ represents hydroxyl, the structure illustrated is erythromycin A. When $R_1$ is, however, also hydrogen, the structure of erythromycin B is illustrated.

Erythromycin, as will be noted from the formula, comprises three cylic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

In order to prepare the erythromycin derivatives here one may start with either erythromycin B or 2' alkanoyl erythromycin B. One of these derivatives is then treated with a dialkylsulfoxide in the presence of an acid anhydride to produce the 2'-alkanoyl-4''-11-O-α-dialkylsulfide-4''-deoxy-4''-oxoerythromycin B. This compound in turn is reacted with a loweralkyl alcohol to produce the 4''-deoxy-11-O-α-dialkylsulfide-4''-oxoerythromycin B. The cyclic acetal derivative in turn is produced from the last-named compound by treating it with a combination of mercuric chloride and mercuric oxide. Lastly, the 4''-deoxy-4''-oxoerythromycin B is prepared from the cyclic acetal by treating the cyclic acetal with dilute hydrochloric acid. Alternatively, the 4''-deoxy-4''-oxoerythromycin B is prepared from the 4''-deoxy-11-O-α-dialkylsulfide-4''-oxoerythromycin B by treatment of this compound with chloramine T in aqueous methanol.

The following examples illustrate fully the preparation of the derivatives of the invention:

EXAMPLE 1

2'-Acetyl-4''-deoxy-11-methylthiomethyl-4''-oxoerythromycin B

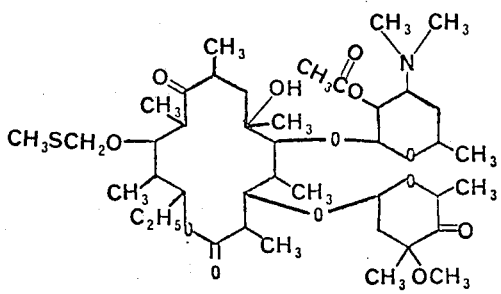

Erythromycin B (2.0 g., 2.8 mmoles) was combined with 20 ml. of dimethylsulfoxide and 14 ml. of acetic anhydride and allowed to stand overnight. The mixture was then poured into cold, 10% sodium carbonate and extracted three times with chloroform. The combined chloroform extracts were washed once with 5% sodium bicarbonate and once with water. After drying over sodium sulfate, solvent was removed to give 2.70 g. of crude product, shown by NMR and TLC to be the desired product.

EXAMPLE 2

4''-Deoxy-11-methythiomethyl-4''-oxoerythromycin B

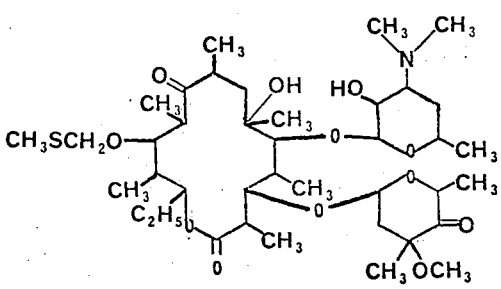

2'-Acetyl-4''-deoxy-11-methylthiomethyl-4''-oxerythromycin B from Example 1 was dissolved in 100 ml. of methanol. To this solution was added 50 ml. of 5% sodium bicarbonate, and the mixture was stirred for 24 hours. Some methanol was removed on the rotary evaporator, water was added to the mixture, and the mixture was extracted three times with chloroform. The combined chloroform extracts were washed with water, dried over sodium sulfate, and solvent was removed to give 2.32 g. of crude product, shown by NMR and TLC to be desired product.

Analysis to as follows:

Analysis calculated for: $C_{39}H_{69}NO_{12}S$, M.W. × 776.049; M.P. = 167° – 173°C.

| Microanalysis | Theory | Found |
|---|---|---|
| C | 60.36 | 60.53 |
| H | 8.96 | 9.05 |
| N | 1.80 | 1.74 |
| O | 24.74 | 24.64 |
| S | 4.13 | 3.97 |

EXAMPLE 3

4''-Deoxy-9,11-O-methylene-4''-oxoerythromycin B-6,9-hemiacetal

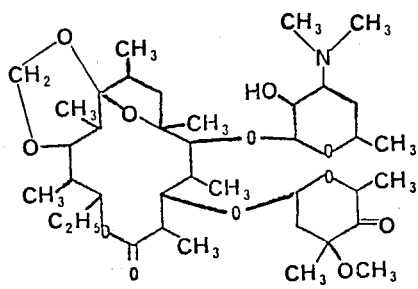

4''-Deoxy-11-methylthiomethyl-4''-oxoerythromycin B (1.0 g., 1.4 mmoles) was dissolved in a solution of 1.0 ml. of water and 30.0 ml. of acetone. When all of the 4''-deoxy-11-methylthiomethyl-4''-oxoerythromycin B had dissolved, 1.0 g. of mercuric oxide and 1.5 g. of mercuric chloride were added and the resulting mixture was stirred for four hours at room temperature. After stirring, the mixture was filtered through a celite mat and the volume was reduced to 30 ml. The filtrate was added to 50 ml. of water and was extracted with two half volumes of chloroform. The combined chloroform extracts were washed three times with half volumes of water and dried over anhydrous magnesium sulfate. The solvent was removed on the rotary evaporator to give 1.16 gm. of crude product.

The material was chromatographed on a column of silica gel (3.5 × 35 cm.) prepared in chloroform and made basic with triethylamine. The material was eluted from the column with chloroform containing 0.01% triethylamine. Fractions containing only the desired compound were collected and evaporated to dryness in vacuo to yield 309 mg. of product.

Analysis is as follows:
Analysis calculated for: $C_{38}H_{65}NO_{12}$, M.W. = 727.94; M.P. = 98° – 101°C.

| Microanalysis | Theory | Found |
|---|---|---|
| C | 62.70 | 62.91 |
| H | 9.00 | 9.19 |
| N | 1.92 | 1.85 |
| O | 26.37 | 26.35 |

EXAMPLE 4

4''-Deoxy-4''-oxoerythromycin B

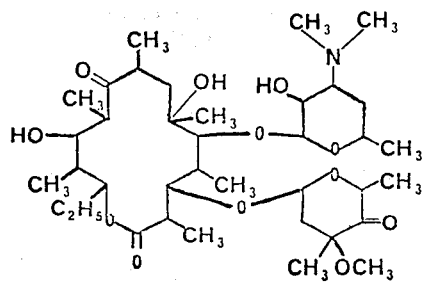

4''-Deoxy-9,11-O-methylene-4''-oxoerythromycin B-6,9-hemiacetal (0.98 g., 1.3 mmoles) was dissolved in 50 ml. of methanol. To this solution was added 50 ml. of 0.02N HCl (HCl solution was added until pH≈2 was obtained). After standing at room temperature for one hour, an excess of sodium bicarbonate was added and the solution was extracted three times with chloroform. The combined chloroform extracts were washed with water and dried over sodium sulfate. Solvent was removed to give 0.97 g. of product, which was chromatographed on a silica gel partition column to give 310 mg. (34%) of clean, white crystals (one spot on TLC).

Analysis is as follows:
Analysis calculated for: $C_{37}H_{65}NO_{12}$, M.W. = 715.931; M.P. = 115° – 117°C.

| Microanalysis | Theory | Found |
|---|---|---|
| C | 62.07 | 61.79 |
| H | 9.15 | 9.31 |
| N | 1.96 | 1.95 |
| O | 26.82 | 27.00 |

EXAMPLE 5

4''-Deoxy-4''-oxoerythromycin B

In this procedure, the 4''-deoxy-4''-oxoerythromycin B compound was prepared directly from the compound of Example 2. Specifically, 4''-deoxy-11-methylthiomethyl-4''-oxoerythromycin B (1.55 g.) in methanol:water (17.3, 20 ml.) was treated with a solution of chloramine T (1.25 g.) in methanol:water (17:3, 4 ml.). The mixture was allowed to stand at room temperature for 75 minutes, then poured into water (150 ml.) and extracted twice with benzene (150 ml. portions). The combined benzene extracts were washed twice with water (150 ml. portions) and extracted twice with 200 ml. portions of 0.1 N hydrochloric acid. The combined acid extracts were basified with ammonium hydroxide and extracted twice with methylene chloride (100 ml. portions). The combined methylene chloride extracts were concentrated to give, as crude product, a white froth (850 mg.).

A portion of the crude product was purified by preparative layer chromatography on "Merck Silica Gel HF 254" plates developed with methanol, benzene, concentrated ammonium hydroxide (33 ml., 67 ml., 3 drops). The major band, as detected by u.v. light, was removed and extracted with cold methanol. The methanol extract was concentrated and the residue was digested in benzene. The benzene solution was filtered and concentrated to give 66 mg. of white froth whose nmr spectrum was identical with that of 4''-deoxy-4''-oxoerythromycin B as obtained in Example 4 above.

EXAMPLE 6

2'-Acetyl-4''-deoxy-4''-oxoerythromycin A

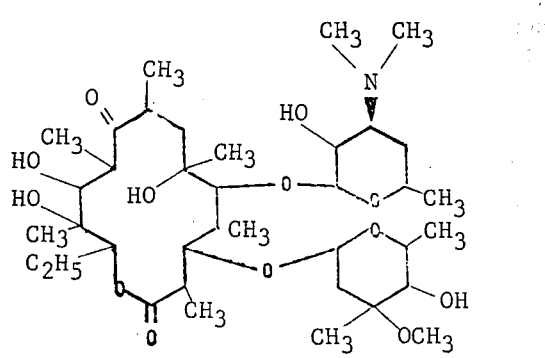

Erythromycin A

DMSO/Ac$_2$O ↓

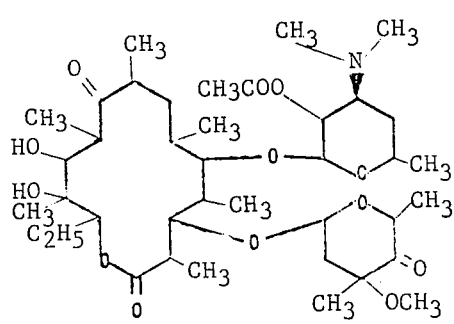

(1)

Erythromycin A (11.4 g.) in dimethyl sulfoxide (120 ml.) was treated with acetic anhydride (40 ml.) and allowed to stand at room temperature for six hours. The mixture was poured into ice cold 5% sodium carbonate solution (1-liter) and extracted twice with chloroform (100 ml. portions). The combined extracts were dried (Na$_2$SO$_4$) filtered and solvent was removed from the filtrate. The white frothy residue was chromatographed over a column of Sephadex LH-20 in chloroform hexane (1/1, v/v). Initial fractions were combined and recrystallized from methylene chloride/hexane mixtures to give 2'-acetyl-4''-deoxy-4''-oxoerythromycin A (3.0 g.) as white crystals, m.p. 117°–118°C. λ max 296 (ε, 51)

| Microanalysis | Theory | Found |
|---|---|---|
| C | 60.5 | 60.1 |
| H | 8.7 | 8.9 |
| N | 1.8 | 1.8 |

EXAMPLE 7

4''-Deoxy-4''-oxoerythromycin A

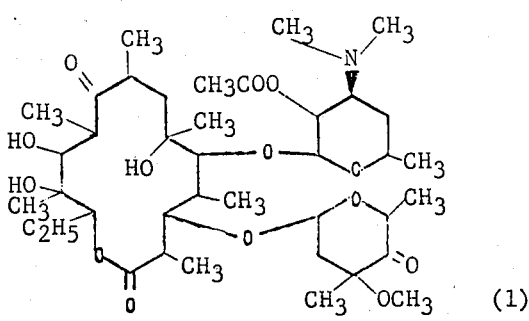
(1)

MeOH ↓

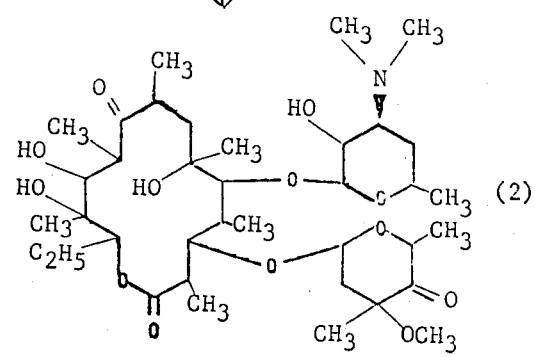
(2)

2'-Acetyl-4''-deoxy-4''-oxoerythromycin A (1) (1.213 g.) in methanol (100 ml.) was allowed to stand at room temperature for three days. Solvent was removed and the residue was chromatographed on a column of Sephadex LH-20 in chloroform/hexane (1/1, v/v). The eluates yielded 4''-deoxy-4''-oxoerythromycin A (558 mg.) as a white amorphous solid.

EXAMPLE 8

4''-Epi-9,11-methylenedioxy erythromycin B-6,9-hemiacetal

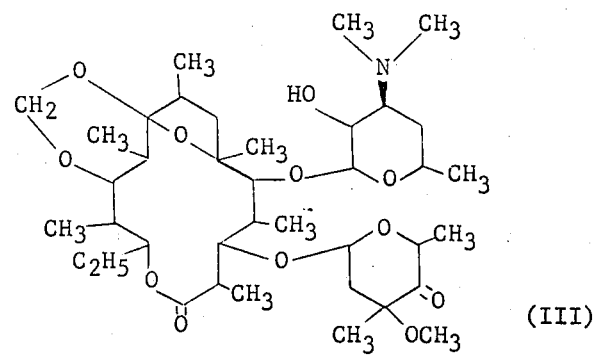
(III)

Raney Nickel ↓

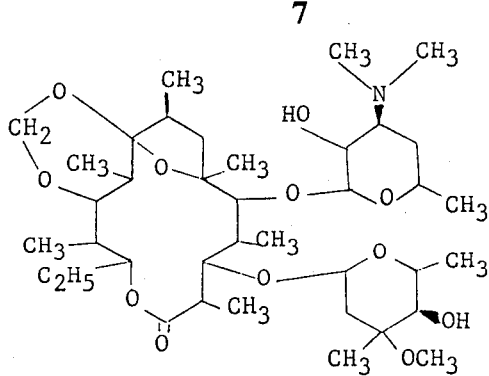

(3)

9,11-Methylenedioxy-4''-oxoerythromycin B-6,9-hemiacetal (III) (11.6 g.) in ethanol (200 ml.) was heated under reflux with W-2 Raney nickel (~50 g.) for 4 hours. The mixture was cooled, filtered through a pad of celite and the celite was washed with ethanol. The combined filtrate and washings were concentrated to give 5.5 g. of solid. A portion (2 g.) was chromatographed on a column of Sephadex LH-20 in chloroform/hexane (1/1, v/v). Later fractions yielded 4''-epi-9,11-methylenedioxy erythromycin B-6,9-hemiacetal (849 mg.).

| Microanalysis | Theory | Found |
|---|---|---|
| C | 62.5 | 62.2 |
| H | 9.3 | 9.2 |
| N | 1.9 | 1.9 |

EXAMPLE 9

2'-4''-Diacetyl-4''-epi-9,11-methylenedioxy erythromycin B-6,9-hemiacetal

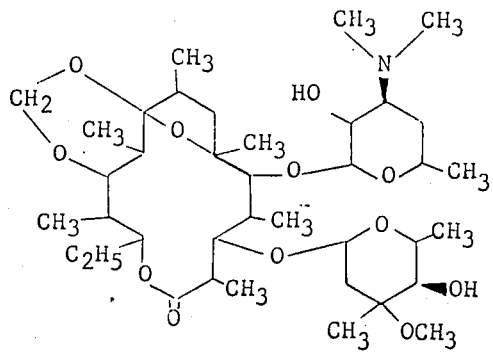

(3)

$$\xrightarrow{\text{Ac}_2\text{O}}{\text{Pyridine}}$$

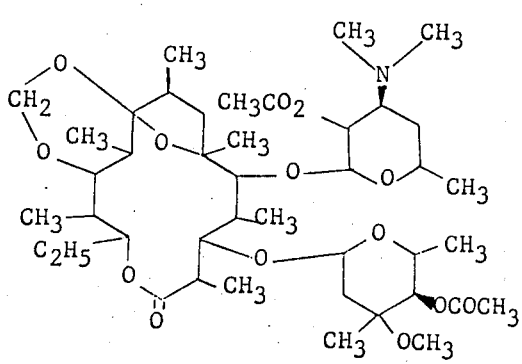

(4)

4''-Epi-9,11-methylenedioxy erythromycin B-6,9-hemiacetal (3) (2.0 g.) in pyridine (12 ml.) was treated with acetic anhydride (6 ml.) for 65 hours at room temperature. The mixture was poured into ice-cold saturated sodium bicarbonate (250 ml.) and extracted three times with chloroform (50 ml. portions). The combined chloroform extracts were washed twice in saturated sodium bicarbonate solution (50 ml. portions), then with water (100 ml.). The organic layer was dried ($Na_2SO_4$), filtered and the filtrate was concentrated to give 2',4''-diacetyl-4''-epi-9,11-methylenedioxyerythromycin B-6,9-hemiacetal (1.5 g.) as a white amorphous solid.

EXAMPLE 10

4''-Acetyl-4''-epi-9,11-methylenedioxy erythromycin B-6,9-hemiacetal

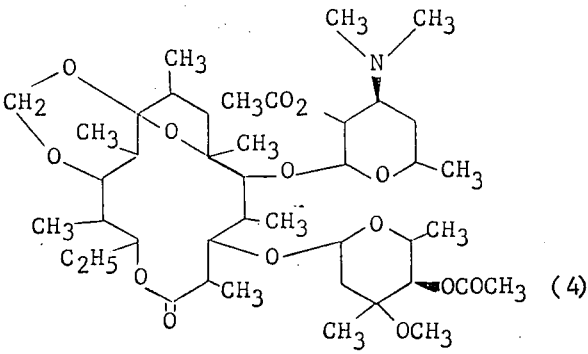

(4)

$$\xrightarrow{\text{MeOH}}$$

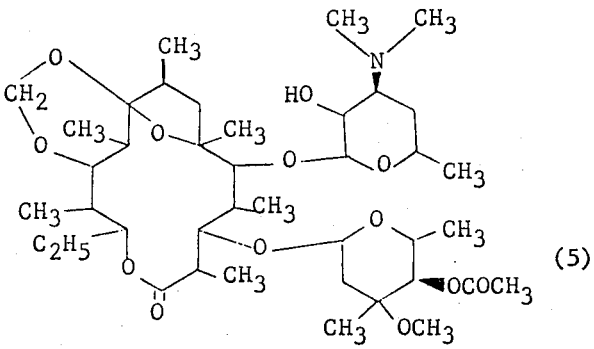

(5)

2'-4''-Diacetyl-4''-epi-9,11-methylenedioxy erythromycin B-6,9-hemiacetal (4) (1.3 g.) was dissolved in methanol (100 ml.) and allowed to stand at room temperature for 1 week, then concentrated to give 4''-acetyl-4''-epi-9,11-methylenedioxy erythromycin B-6,9-hemiacetal (1.1 g.) as a white amorphous solid.

EXAMPLE 11

4''-Acetyl-4''-epi erythromycin B

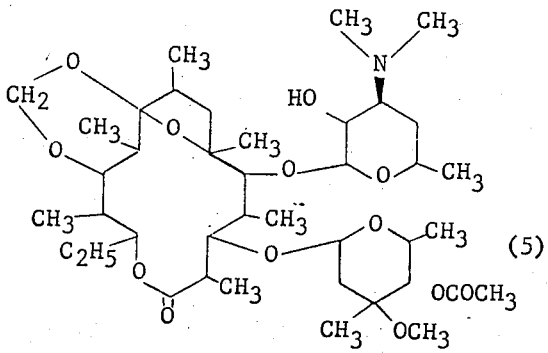

(5)

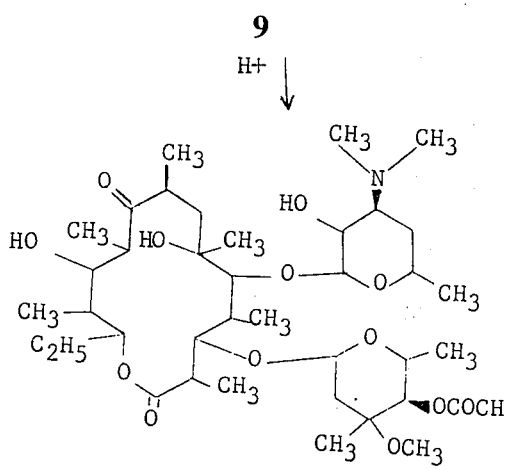

(6)

4″-Acetyl-4″-epi-9,11-methylenedioxy erythromycin B-6,9-hemiacetal (1.5 g.) in acetic acid (20 ml.) was diluted with water (20 ml.) and allowed to stand at room temperature for 3 hours. The mixture was added dropwise to a stirred ice-cold saturated aqueous solution of sodium bicarbonate (1-liter). Ice, ether and solid sodium bicarbonate were added to the bicarbonate solution during the addition. The mixture was stirred for a further 10 minutes after the addition was complete and was extracted three times with chloroform, (100 ml., 50 ml., 50 ml.). The combined organic extracts were washed twice with water (150 ml. portions) and concentrated. The concentrate was chromatographed on a column of Sephadex LH-20 in chloroform, heptane, ethanol, 10/10/1 (v/v/v). Later eluates were combined to give 4″-acetyl-4″-epi-erythromycin B (420 mg.).

EXAMPLE 12

4″-Epi-erythromycin B

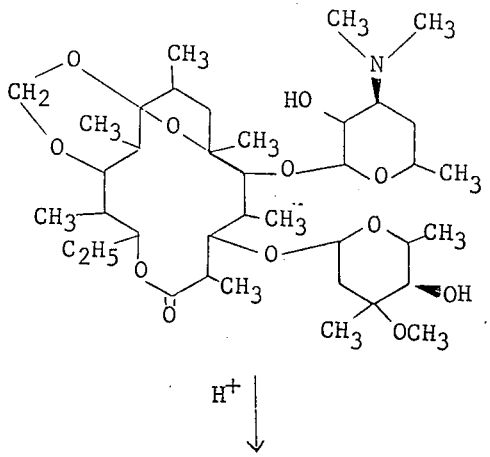

(3)

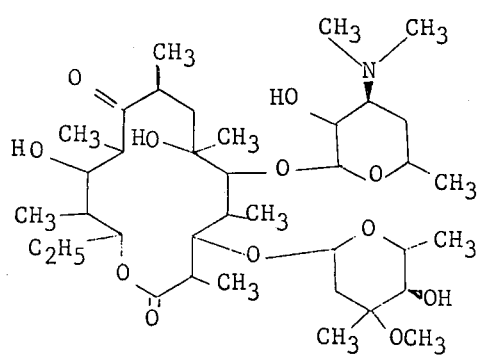

(7)

4″-Epi-9,11-methylenedioxy erythromycin B-6,9-hemiacetal (3) (5.1 g.) was dissolved in acetic acid (100 ml.) and water (100 ml.) was added. The mixture was allowed to stand at room temperature for 3½ hours and then added slowly to K₂CO₃ (150 g.) in iced water (200 ml.). The mixture was extracted twice with chloroform (100 ml. portions) and the combined extracts were washed with water (200 ml.) and concentrated. The concentrate was passed down a column of Sephadex LH-20 in chloroform hexane (1/1, v/v). Later eluates were concentrated and recrystallized from chloroform hexane mixtures to give 4″-epi erythromycin B, m.p. 145°–150°C.

| Microanalysis | Theory | Found |
|---|---|---|
| C | 61.9 | 61.6 |
| H | 9.4 | 9.6 |
| N | 2.0 | 1.9 |

EXAMPLE 13

4″-Epi erythromycin B

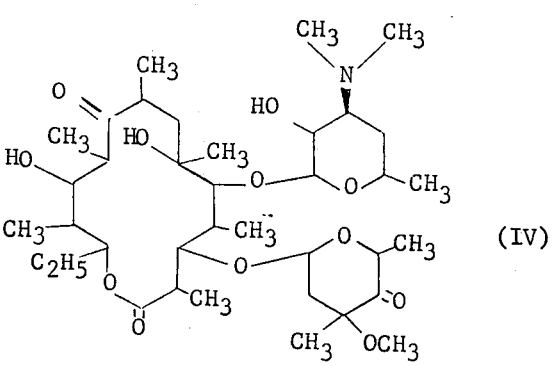

(IV)

Raney Nickel

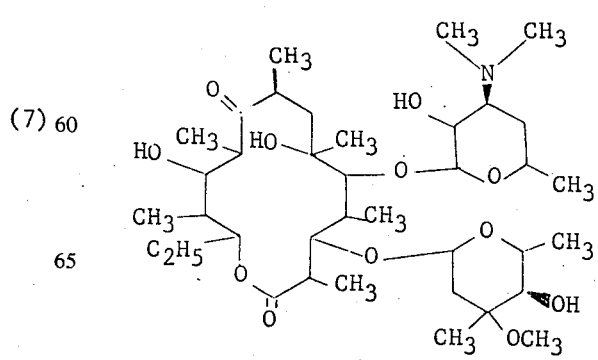

4''-Deoxy-4''-oxoerythromycin B (1.5 g.) in ethanol (50 ml.) heated under reflux with 50 ml. of a thick suspension of W-2 Raney Nickel for 3 hours. The mixture was allowed to cool to room temperature and filtered. The filtrate was concentrated and passed through a column of Sephadex LH-20 in methanol. Eluates were concentrated and passed through a 200 tube countercurrent distribution machine charged with a system n-heptane (25 parts), benzene (50 parts), acetone (15 parts), iso-propanol (10 parts), 0.01 M aqueous potassium phosphate buffered at pH 7.0 (25 parts). Upper phases were collected after 200 transfers. Initial fractions gave 4''-epi erythromycin B (356 mg.).

The compounds were then tested for their activity against gram-positive and gram-negative bacteria in an agar dilution test. The activity of the compounds is compared with that of both Erythromycin A and Erythromycin B. The results are given in MIC values (minimum inhibitory concentrations) expressed in micrograms/ml.

The results are as follows:

TABLE I

| Organism | MIC (in Mcg/ml) | | | |
|---|---|---|---|---|
| | Erythromycin A | Erythromycin B | Ex. 1 | Ex. 2 |
| Staphylococcus aureus 9144 | 0.39 | 0.39 | 3.1 | 3.1 |
| Staphylococcus aureus Smith | 0.39 | 0.39 | 3.1 | 3.1 |
| Staphylococcus aureus Smith ER | >100 | >100 | >100 | >100 |
| Staphylococcus aureus Quinones | >100 | >100 | >100 | >100 |
| Staphylococcus aureus Wise 155 | >100 | >100 | >100 | >100 |
| Streptococcus faecalis 10541 | 0.1 | 0.1 | 0.39 | 0.78 |
| Escherichia coli Juhl | 50 | 100 | 1000 | >1000 |
| Klebsiella pneumoniae 10031 | 6.2 | 6.2 | 25 | 50 |
| Proteus vulgaris Abbott JJ | >100 | >100 | >1000 | >1000 |
| Proteus mirabilis Finland No. 9 | >100 | >100 | >1000 | >1000 |
| Salmonella typhimurium Ed No. 9 | 50 | 100 | 1000 | >1000 |
| Shigella sonnei 9290 | 25 | 25 | >100 | >100 |
| Pseudomonas aeruginosa BMH No. 10 | 100 | 100 | 1000 | >1000 |
| Streptococcus pyogenes Roper | >100 | >100 | >100 | >100 |
| Streptococcus pyogenes Scott | >100 | >100 | >100 | >100 |
| Haemophilus influenzae 9334 | 6.2 | 6.2 | 100 | 100 |
| Haemophilus influenzae Brimm | 3.1 | 3.1 | 50 | 50 |
| Haemophilus influenzae Illinois | 1.56 | 3.1 | 25 | 25 |
| Haemophilus influenzae Patterson | 3.1 | 3.1 | 50 | 100 |
| Haemophilus influenzae Shemwell | 3.1 | 3.1 | 50 | 100 |
| Haemophilus influenzae Terry | 3.1 | 3.1 | 50 | 100 |

| Organism | Ex. 3 | Ex. 4 | Ex. 6 | Ex. 7 | Ex. 8 |
|---|---|---|---|---|---|
| Staphylococcus aureus 9144 | 0.78 | 3.1 | 0.78 | 1.6 | 0.78 |
| Staphylococcus aureus Smith | 0.78 | 3.1 | 1.6 | 1.6 | 0.78 |
| Staphylococcus aureus Smith ER | >100 | >100 | >100 | >100 | >100 |
| Staphylococcus aureus Quinones | 100 | >100 | >100 | >100 | — |
| Staphylococcus aureus Wise 155 | 25 | >100 | >100 | >100 | — |
| Streptococcus faecalis 10541 | 0.39 | 0.78 | 0.39 | 0.39 | 0.39 |
| Escherichia coli Juhl | >1000 | 1000 | >100 | >100 | >100 |
| Klebsiella pneumoniae 10031 | 25 | 25 | 12 | 12 | 25 |
| Proteus vulgaris Abbott JJ | >1000 | >1000 | >100 | >100 | >100 |
| Proteus mirabilis Finland No. 9 | >1000 | >1000 | >100 | >100 | >100 |
| Salmonella typhimurium Ed No. 9 | >1000 | 1000 | >100 | >100 | >100 |
| Shigella sonnei 9290 | >100 | >100 | 100 | 50 | 100 |
| Pseudomonas aeruginosa BMH No. 10 | 1000 | 1000 | >100 | >100 | 100 |
| Streptococcus pyogenes Roper | 100 | >100 | >100 | >100 | >100 |
| Streptococcus pyogenes Scott | >100 | >100 | >100 | >100 | >100 |
| Haemophilus influenzae 9334 | >100 | 50 | 25 | 25 | — |
| Haemophilus influenzae Brimm | 100 | 25 | 12 | 12 | — |
| Haemophilus influenzae Illinois | 50 | 25 | 12 | 12 | — |
| Haemophilus influenzae Patterson | 100 | 50 | 12 | 12 | — |
| Haemophilus influenzae Shemwell | 100 | 50 | 12 | 12 | — |
| Haemophilus influenzae Terry | 100 | 25 | 12 | 12 | — |

| Organism | Ex. 9 | Ex. 10 | Ex. 11 | Ex. 12 |
|---|---|---|---|---|
| Staphylococcus aureus 9144 | 1.56 | 1.56 | 0.39 | 0.39 |
| Staphylococcus aureus Smith | 1.56 | 1.56 | 0.39 | 0.39 |
| Staphylococcus aureus Smith ER | >100 | 100 | >100 | 6.2 |
| Staphylococcus aureus Quinones | 6.2 | 6.2 | 25 | 50 |
| Staphylococcus aureus Wise 155 | 6.2 | 6.2 | >100 | 25 |
| Streptococcus faecalis 10541 | 0.78 | 0.78 | 0.1 | 0.2 |
| Escherichia coli Juhl | >100 | >100 | >100 | 100 |
| Klebsiella pneumoniae 10031 | 100 | 100 | 50 | 6.2 |
| Proteus vulgaris Abbott JJ | >100 | >100 | >100 | >100 |
| Proteus mirabilis Finland No. 9 | >100 | >100 | >100 | >100 |
| Salmonella typhimurium Ed No. 9 | >100 | >100 | >100 | >100 |
| Shigella sonnei 9290 | >100 | >100 | >100 | 25 |
| Pseudomonas aeruginosa BMH No. 10 | >100 | >100 | >100 | 100 |
| Streptococcus pyogenes Roper | 50 | 50 | >100 | 12.5 |
| Streptococcus pyogenes Scott | 100 | 100 | >100 | 3.1 |
| Haemophilus influenzae 9334 | — | — | — | 3.1 |
| Haemophilus influenzae Brimm | — | — | — | — |
| Haemophilus influenzae Illinois | — | — | — | — |
| Haemophilus influenzae Patterson | — | — | — | — |
| Haemophilus influenzae Shemwell | — | — | — | — |
| Haemophilus influenzae Terry | — | — | — | — |

We claim:
1. A 4''-deoxy-4''-oxoerythromycin derivative having a formula selected from the group consisting of:

Formula III

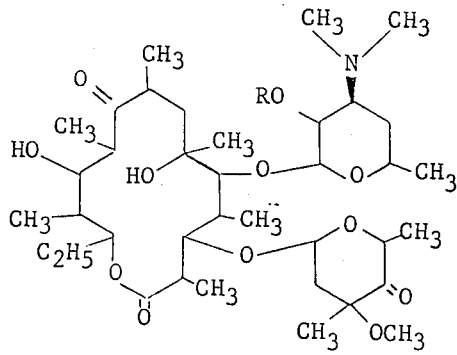

where R is hydrogen or CH₃CO;

Formula IV

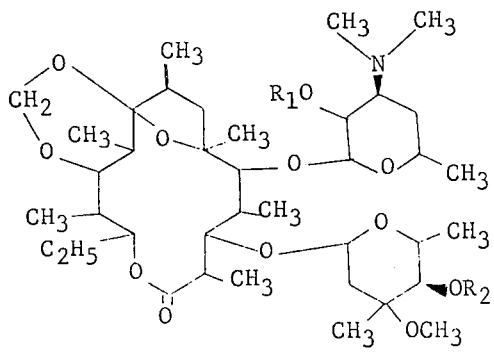

where $R_1$ is hydrogen or RCO where R is as before defined, $R_2$ is hydrogen, CH₃CO or RCO; and Formula V

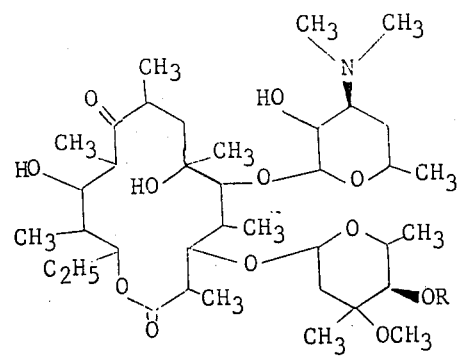

where $R_3$ is H or RCO where R is as before defined.

2. The compound of claim 1 wherein R is CH₃CO in Formula III.
3. The compound of claim 1 wherein R is H in Formula III.
4. The compound of claim 1 wherein $R_1$ and $R_2$ are H in Formula IV.
5. The compound of claim 1 wherein $R_1$ and $R_2$ are CH₃CO in Formula IV.
6. The compound of claim 1 wherein $R_1$ is hydrogen and $R_2$ is CH₃CO in Formula IV.
7. The compound of claim 1 wherein $R_3$ is CH₃CO in Formula V.
8. The compound of claim 1 wherein $R_3$ is hydrogen.

* * * * *